United States Patent
Thomassin

(10) Patent No.: US 6,385,896 B1
(45) Date of Patent: May 14, 2002

(54) FISHING LURE

(75) Inventor: Robert Thomassin, Villemaur-sur-Vanne (FR)

(73) Assignee: Delalande Peche, Ballan-Mire (FR)

( * ) Notice: Subject to any disclaimer, the term of this patent is extended or adjusted under 35 U.S.C. 154(b) by 0 days.

(21) Appl. No.: 09/600,657

(22) PCT Filed: Jan. 20, 1999

(86) PCT No.: PCT/FR99/00108

§ 371 Date: Aug. 8, 2000

§ 102(e) Date: Aug. 8, 2000

(87) PCT Pub. No.: WO99/37144

PCT Pub. Date: Jul. 29, 1999

(30) Foreign Application Priority Data

Jan. 27, 1998 (FR) ............................................. 98 01025

(51) Int. Cl.[7] ............................................. A01K 85/00
(52) U.S. Cl. ......................................................... 43/42.03
(58) Field of Search ............................. 43/42.03, 42.5, 43/42.24

(56) References Cited

U.S. PATENT DOCUMENTS

| | | | | |
|---|---|---|---|---|
| 1,495,832 A | * | 5/1924 | Aiken | 43/42.28 |
| 1,926,459 A | * | 9/1933 | Sisco | 43/42.28 |
| 2,561,515 A | * | 7/1951 | Keeler | 43/42.5 |
| 2,995,856 A | * | 8/1961 | Murawski | 43/42.06 |
| 3,735,518 A | * | 5/1973 | Kleine et al. | 43/42.04 |
| 3,879,882 A | * | 4/1975 | Rask | 43/42.28 |
| 3,899,847 A | * | 8/1975 | Dworski | 43/42.09 |
| 4,044,492 A | * | 8/1977 | Ingram | 43/42.28 |
| 4,471,556 A | * | 9/1984 | Dworski | 43/42.23 |
| 4,581,841 A | * | 4/1986 | Gish | 43/26.2 |
| 4,790,101 A | * | 12/1988 | Craddock | 43/42.37 |
| 5,182,875 A | * | 2/1993 | Righetti | 43/42.24 |
| 5,193,299 A | * | 3/1993 | Correll et al. | 43/42.47 |

\* cited by examiner

*Primary Examiner*—Michael J. Carone
*Assistant Examiner*—Jordan Lofdahl
(74) *Attorney, Agent, or Firm*—Harrison & Egbert

(57) ABSTRACT

A fishing lure designed to reproduce, when it is pulled along in the water, the swimming movements of a live fish. The lure(1) is in the general shape of a fish comprising a head (2) and a tail (4) linked by a soft and flexible body (3) having a longitudinal axis (5). The head (2) receives, proximate its front surface (6), a front spoon (7). The lure includes, besides the front spoon (7), at least three additional spoons including a central spoon (8), an anal spoon (9) and a caudal spoon (10).

12 Claims, 1 Drawing Sheet

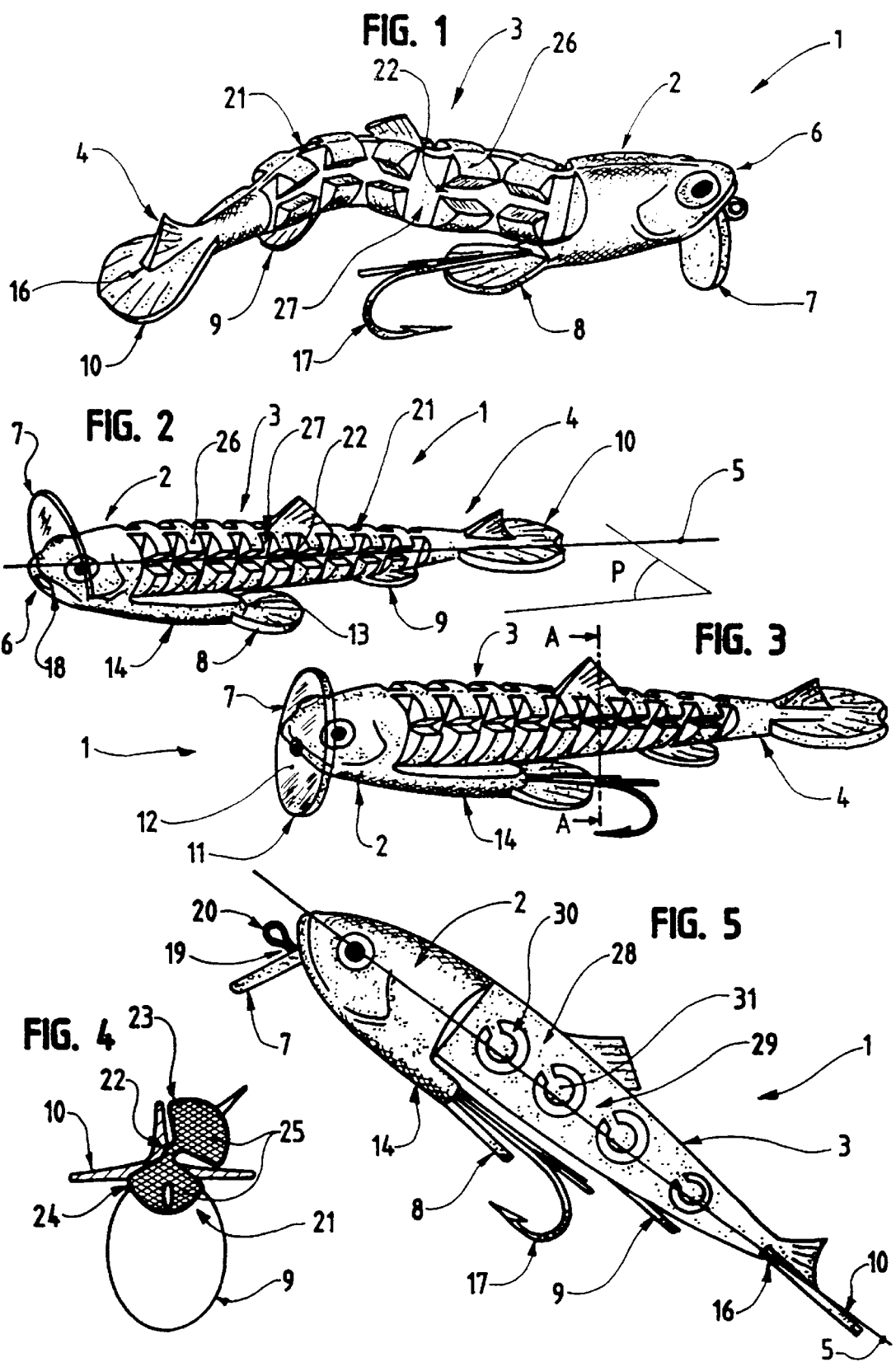

FISHING LURE

BACKGROUND OF THE INVENTION (1) Field of the Invention

This invention relates to a fishing lure designed so as to reproduce, when it is pulled along in the water, the swimming movements of a live fish, said lure having a general shape of a fish including a head and a tail linked by a soft and flexible body having a longitudinal axis, and said head receiving, close to its front surface, a front spoon.

This invention relates to the field of the manufacture of moving fishing lures.

These lures are designed for fishing, namely for professional and/or sports fishing, such as casting, trolling, swinging, feel or slack fishing. Under such circumstances, these lures are subjected to the pulling of a fishing line to which they are connected and which will impart a movement to them in the water. Such lures are then designed so as to reproduce as accurately as possible the swimming movement of the live fish the lure should imitate.

(2) Description of the Related Art

There are already known a number of moving lures that are generally in the shape of a small fish, namely of in shape of a fish that is the usual prey of the carnivorous fresh-water or salt-water fishes.

Thus, from the French patent FR-1,461,674 there is known a lure meeting the above description and including namely a head in the lower portion of which is arranged a front spoon, the latter extending downwards and forwards with respect to the lure. The head of the lure is extended, towards the tail, with a body formed by a thin, extra soft membrane arranged in a vertical and/or horizontal symmetry plane.

Such a lure arranged in a watercourse is capable of having an undulating and oscillating movement in which the initial impulse is imparted by the front spoon. However, the body of the lure which is formed by a thin membrane has an undulating motion of a relatively low quality. This mainly results into a flabby reaction as well as into a rather limited structural behavior of the lure during its swimming.

One should note, in addition, that such lures must generally be provided with a shotted head, in order to impart to them an adequate horizontal position. Such a mounting results into rigidifying the front portion of the lure and into considerably limiting the movements of the rear portion.

The solution then consists in rigidifying the body of the lure, which allows the latter to adopt a movement that relatively well reproduces the natural swimming of a live model. However, a movement of such a quality can only be achieved within a limited range of speeds. Such lures are indeed relatively inert at low speeds, whereas their behavior at high speed becomes particularly chaotic and, under such circumstances, one can often see the lure turning upside down. To this has to be added a relatively high manufacturing cost, due to the nature of the implemented materials as well as to the manufacturing and assembling techniques.

A solution for these problems has been provided by the invention described in the French patent FR-2,724,091 that relates to a moving lure with double spoons. In this document there is described a lure that is in the form of a dead or artificial fish fixed, through adequate means, to a rigid blade. The latter includes, on the one hand, in its front portion, a front spoon arranged under or at the front of the head of the fish. This rigid blade includes, on the other hand, a rear spoon oriented towards the tail of the fish and arranged in the vicinity of the end of the body, substantially at the junction between the latter and said tail. Such a rigid blade, when it is subjected to a pulling in the water, adopts an oscillating motion about a pivot point.

However, though such an embodiment allows imparting to the lure a particularly regular and stable oscillation, one should note that said blade results into rigidifying the aggregate formed by the head and the body of the lure, so that only the tail is capable of forming a moveable element capable of adopting a fluttering motion or the like. This results into the lure being incapable of adopting a totally natural movement.

From U.S. Pat. No. 3,735,518 there is also known a fishing lure designed so as to reproduce, when it is pulled along in the water, the swimming movements of a live fish. This lure includes a head and a tail linked by a soft and flexible body having a longitudinal axis. This lure receives a back spoon as well as, at the level of its tail, a caudal spoon. Said lure can also receive and anal spoon as well as a pelvic spoon.

BRIEF SUMMARY OF THE INVENTION

This invention is aimed at solving the above-mentioned problems by means of a lure including means capable of generating natural swimming movements.

To this end, the invention relates to a fishing lure designed so as to reproduce, when it is pulled along in the water, the swimming movements of a live fish, and lure having a general shape of a fish including a head and a tail linked by a soft and flexible body having a longitudinal axis, said head receiving, close to its front surface, a front spron.

The lure includes, besides said front spoon, at least three additional spoons, including a central spoon, an anal spoon and a caudal spoon.

The central, anal and caudal spoons have a substantially flat shape and are each contained in a plane each forming an angle of 0° to 20° with a reference plane formed by the horizontal median plane of the lure.

According to another feature of this invention, the soft body of the lure includes a membrane that has in its median portion and in axial direction, a narrowed cross-section that allows axial flexibility through rotation of the upper and/or lower portion of said body about its longitudinal axis.

The soft body of such a lure can also be formed of a flat and soft membrane that has, in its median portion and in axial direction, one or several arrangements capable of defining areas of varying rigidity of said membrane authorizing namely axial flexibility about the longitudinal axis.

Thus, the main feature of this invention consists in that the lure receives a number of spoons, the latter being arranged from the head to the tail of said lure. Such spoons advantageously allow completing and amplifying, over the whole length of the lure, the initial oscillating motion imparted by the front spoon under the action of the pulling in the water.

According to another feature of this invention, the body of the lure is of a soft and flexible type. This body is formed of a membrane that imparts axial flexibility to it both about its longitudinal axis and perpendicularly to the latter.

Such flexibility allows, in particular, the propagation of the initial oscillating motion over the whole body of the lure, the latter being then capable of adopting a swimming movement that looks particularly natural.

This invention is described more in detail in the following description relating to embodiments that are given only by way of an example.

This description will be better understood when referring to the attached drawings.

BRIEF DESCRIPTION OF THE SEVERAL VIEWS OF THE DRAWINGS

FIG. 1 is a schematic view of a lure corresponding to a first embodiment in which the front spoon is oriented downward.

FIG. 2 is a schematic view similar to FIG. 1 and corresponds to a second embodiment in which the front spoon is oriented upward.

FIG. 3 is a schematic view similar to the preceding one and corresponds to a third embodiment in which the front spoon is formed of a disc arranged at the front of the head of the lure.

FIG. 4 is a schematic and cross-sectional view according to line A—A of the body of the lure.

FIG. 5 is a schematic and elevation view of a lure corresponding to a particular embodiment of the membrane of the soft body.

DESCRIPTION OF THE INVENTION

As can be seen, namely from the figures of the drawing, this invention relates to the field of the manufacture of moving fishing lures.

Such a lure is designed so as to reproduce, when it is pulled along in the water, the swimming movements of a live fish. It can, in addition, reproduce more or less accurately the outer aspect of the fish.

As shown in FIGS. 1 through 3 and 5, such a lure 1 adopts the general form of a fish, namely that of the prey it should imitate. To this end, it includes a head 2 and a tail 4 linked to each other by a body 3 that is, in this case, of a soft and flexible type.

One should generally note that such a lure 1, and thus its body 3, has a longitudinal axis 5 along which it extends. In addition, this lure 1 adopts a generally symmetrical shape, namely with respect to a vertical symmetry plane, not shown.

Such a lure 1 has also a median plane P that, under normal conditions of use of the lure 1, i.e. when the latter is submerged and subjected to the pulling of a fishing line, is chosen as being horizontal.

As shown in FIGS. 1 through 3 and 5, the head 2 has a front face 6 in the vicinity of which the lure 1 is capable of receiving a front spoon 7.

According to the invention, said lure 1 includes, besides said front spoon 7, at least three more additional spoons, including a central spoon 8, an anal spoon 9 as well as a caudal spoon 10.

As regards in particular said front spoon 7, it can be in various forms and be arranged in various ways in the vicinity of the front face 6 of the head 2.

According to the embodiments shown in FIGS. 1 and 2, such a front spoon 7 adopts a globally flat shape with a contour that looks like a petal of a flower. This front spoon 7 is then located in a plane that is, on the one hand, inclined forwardly with respect to the lure 1 and, on the other hand, oriented, as the case may be, downwards or upwards.

More particularly, one should note that the plane in which said front spoon 7 is located forms an angle of 50° to 70°, but preferably equal to 60°, with a reference plane. The latter will preferably be chosen as being the horizontal median plane P of the lure 1.

According to a third embodiment shown in FIG. 3, such a front spoon 7 is in the form of a disc 11 the surfaces 12 of which is substantially perpendicular to the longitudinal axis 5.

As regards now the central spoon 8, it is located in the lower portion of the lure 1. It is made integral, directly or indirectly, with the rear portion of the head 2 of the lure 1 and extends, under the body 3, and towards the tail 4.

According to a first embodiment, not shown, such a central spoon 8 can be made directly integral with the head 2. However, as shown in FIGS. 2, 3 and 5, this central spoon 8 is preferably located at the free end 13 of a bracket 14 connected to the head 2, namely at the lower and rear portion of the latter.

The lure 1 also includes an anal spoon 9 arranged at the lower portion of the body 3 which it is made integral with, preferably in the vicinity of the tail 4 towards which said anal spoon 9 extends.

Finally, this lure 1 includes a caudal spoon 10 arranged at the level of its tail 4. More particularly, this causal spoon 10 is located at the free end 16 of said tail 4, from which it extends and arm which it forms, for example, the extension.

According to a preferred embodiment, the central spoon 8, the anal spoon 9 as well as the caudal spoon 10 have a substantially flat shape, with a contour that looks like a petal of a flower. Each of these spoons 8, 9 and 10 is then contained in a plane. Each of these planes is individually or collectively capable of forming an angle of 0° to 20° with a reference plane preferably formed by the horizontal median plane P of the lure 1.

At this point, it should be stated that this lure 1 is of a soft or semi-soft type. Therefore, one or several materials with different rigidities can be used to manufacture it.

However, according to a preferred embodiment, said lure 1 is made, by molding, of a synthetic material.

Such a molding process then advantageously allows manufacturing, in one single operation, the complete lure 1, including the front 7, central 8, anal 9 and caudal 10 spoons that are then molded in the mass of this lure 1.

Sometimes it is however preferable to be able to change the arrangement or the shape of at least one of these spoons according to the kind of fishing contemplated.

Therefore, according to another embodiment, at least one of the spoons, namely the front spoon 7 and/or the central spoon 8, is not molded during the operation consisting of molding the lure 1, but is manufactured separately and attached to the latter during an assembling operation.

Such an assembling operation can, for example, be carried out during the fixing of the lure 1.

In this respect, as can be seen in FIG. 2, the lure 1 has, namely at the level of its head 2, a through-hole 18 through which can pass a hook 17 with a view to such mounting.

Said hook 17 has a free end 19 ending at the front of the head 2 and provided with a bow 20 or the like for fixing the fishing line.

Also at the level of this free end 19, the hook 17 can receive a front spoon 7, with a view to fixing the latter against the lure 1 when it is not provided with one during its molding.

One should note that this hook 17 can also serve for fixing the central spoon 8, directly or indirectly, against the head 2 or, as the case may be, to the bracket 14.

Such a way of operating then allows a fisher, when attaching his lure 1, to provide it with a front spoon 7 and/or a central spoon 8 with a different shape. This allows giving a personal touch to the lure 1, but also adopts the lure to the kind of fishing one wants to do.

The present invention also includes a lure 1 at least the body 3 of which is of a soft and flexible type.

According to a preferred embodiment shown in FIGS. 1 through 4, the soft body 3 includes a membrane 21 that, in its median portion 22 and in axial direction, has a narrowed cross-section. This narrowing allows axial flexibility through rotation of the upper 23 and/or lower 24 portion of said body 3 about its longitudinal axis 5, as shown in FIG. 4.

As a matter of fact, the upper portion 23 and/or the lower portion 24 of the body 3 is defined by a rim 25 extending alongside at least a portion of the body 3 of the lure 1, between the head 2 and the tail 4 of the same.

According to a first embodiment, now shown, said rim 25 is of a continuous type.

However, according to another preferral embodiment, the rim 25 is of a discontinuous type and is then formed of portions 26 of a rim 25 separated by portions 27 of a membrane 21 with a narrowed cross-section. These portions 26 of a membrane 21 are preferably oriented perpendicularly to the longitudinal axis 5 of the body 3 of the lure 1 and define areas with a reduced rigidity of the membrane 21 capable of imparting to the latter axial flexibility perpendicular to the horizontal axis 5.

As can be seen in FIGS. 1 through 3 corresponding to a preferred embodiment of the invention, the upper portion 23 as well as the lower portion 24 of the body 3 are formed by a rim 25 of a discontinuous type the portions 26 of which are arranged pairwise and symmetrically with respect to the narrowed cross-section of the median portion 22 of the membrane 21. Here too, the portions 26 of the rim 25 are separated by portions 27 of the membrane 21 with a narrowed cross-section.

One should generally note that the size of a fish globally decreases from the head towards the tail, usually going through a maximum size at the level of its body. As a matter of fact, it is possible to manufacture a lure 1 having such features, in order to be as close as possible to a live model.

However, excellent results have been achieved with a lure 1 tapering from the head 2 to the tail 4. Such a tapered shape is then also to be found at the level of the body 3 using the portions 26 of the rim 25 which have a decreasing cross-section starting from the head 2 and towards the tail 4 of the lure 1.

There has so far been modified a membrane 21 with an upper 23 and/or lower 24 portion formed by a rim 25 or by portions 26 of the latter. This is of course a particular embodiment and one should know that the invention is in no way limited to it. Thus, one can also contemplate to arrange masses, namely in the form of studs or the like, instead of these portions 26 of a rim 25.

According to another embodiment, the soft body 3 is in the form of a flat and flexible membrane 28 that, in its median portion 29 and in axial direction, has one or several arrangements capable of defining areas of a varying rigidity of said membrane 28 capable of allowing varying flexibility of the latter, namely axial flexibility about the longitudinal axis 5.

Such arrangements can, for example, be in the form of a continuous or discontinuous rim, such as the one described above, or such arrangements can be formed by masses fixed on both sides against the membrane 28, preferably in a symmetrical way.

However, according to a preferred embodiment shown in FIG. 5, these arrangements are in the form of one or several holes 30 the shape of which can be designed so as to impart to the membrane 28 axial flexibility, in particular through rotation about the longitudinal axis 5.

To this end, such holes 30 can, for example, have a circular shape and/or be designed so as to to show flaps 31, as shown in FIG. 5.

As results from the preceding description, the rim 25, its portions 26 as well as the arrangements of the membrane 28 allow axial flexibility of the body 3 of the lure 1 about the longitudinal axis 5, but also perpendicularly to the latter. Such flexibility then allows a sinuous movement of the body 3 and the tail 4 of the lure 1.

One should note that in the case of a lure 1 provided with a front spoon 7, it is, as a matter of fact, the latter that, under the action of the stream and/or the pulling of the fishing line, that causes the head 2 to permanently tilt from left to right. This tilting forms the beginning of the oscillating swimming of the lure 1. This start is completed and amplified by the other three central 8, anal 9, caudal 10 spoons arranged, for that purpose, in an adequate way over the whole length of the lure 1.

Thus, the use of these various front 7, central 8, anal 9 and caudal 10 spoons in combination with a soft body 3 with a membrane 21, 28, as the case may be, with a rim 25 or with arrangements, allows imparting to the so formed lure 1 a swimming movement that imitates the swimming of a live modal in a particularly realistic way.

This invention therefore represents considerable progress, compared to the lures known so far and forming the state of technique.

I claim:

1. A fishing lure apparatus for reproducing the swimming movement of a live fish when pulled through water, the apparatus comprising:
   a body having a shape resembling the live fish, said body having a head at one end and a tail at an opposite end, said body being of a soft and flexible material, said body having a longitudinal axis and a horizontal median plane, said head having a front surface;
   a front spoon received by said head adjacent said front surface;
   a central spoon affixed to said body between said head and said tail;
   an anal spoon affixed to said underside of said body adjacent said tail; and
   a caudal spoon affixed to an end of said tail, said central spoon and said anal spoon and said caudal spoon each having a substantially flat shape and forming an angle of between 0° and 20° with respect to said horizontal plane of said body.

2. The apparatus of claim 1, said front spoon being in a plane inclined toward said front surface of said heat at an angle of 50° to 70° with respect to said horizontal median plane.

3. The apparatus of claim 1, said front spoon being a disk having a surface substantially perpendicular to said longitudinal axis.

4. The apparatus of claim 1, said central spoon positioned adjacent a rear of said head, said central spoon secured by a bracket on said underside of said body and extending toward said tail.

5. The apparatus of claim 1, said anal spoon extending toward said tail.

6. The apparatus of claim 1, said caudal spoon extending outwardly from said caudal spoon extending outwardly from said end of said tail.

7. The apparatus of claim 1, said body having a membrane having a median portion, said body having a narrow cross-section at said median portion and extending axially along said body, said body having an upper portion pivotable relative to a lower portion about said narrow cross-section.

8. The apparatus of claim 7, said upper portion and said lower portion being formed by a rim extending along a portion of said body between said head and said tail.

9. The apparatus of claim 8, said rim being of discontinuous portions, said discontinuous portions being separated by portions of a membrane, said portions of said membrane having a narrowed cross-section oriented perpendicularly to said longitudinal axis, said discontinuous portions being arranged in symmetrical pairs with respect to said narrowed cross-section of said median portion.

10. The apparatus of claim 9, said discontinuous portions having a cross-section of decreasing area extending from said head to said tail.

11. The apparatus of claim 1, said body being a flexible membrane having a median portion, said flexible membrane having areas of varying rigidity extending axially along said body.

12. The apparatus of claim 1, at least one of said spoons being molded into said body, at least one of said spoon being affixed to said body, and body being of a molded material.

* * * * *